(12) United States Patent
Huang et al.

(10) Patent No.: US 8,311,358 B2
(45) Date of Patent: Nov. 13, 2012

(54) METHOD AND SYSTEM FOR IMAGE EXTRACTION AND IDENTIFICATION

(75) Inventors: Yea-Shuan Huang, Hsinchu (TW); Chu-Yun Li, Hsinchu (TW)

(73) Assignee: Chung-Hua University, Hsinchu (TW)

( * ) Notice: Subject to any disclaimer, the term of this patent is extended or adjusted under 35 U.S.C. 154(b) by 377 days.

(21) Appl. No.: 12/835,263

(22) Filed: Jul. 13, 2010

(65) Prior Publication Data

US 2011/0280488 A1    Nov. 17, 2011

(30) Foreign Application Priority Data

May 11, 2010   (TW) ............................... 99114876 A

(51) Int. Cl.
*G06K 9/40* (2006.01)
(52) U.S. Cl. ........ 382/260; 382/274; 382/275; 382/282; 358/3.26; 358/3.27; 358/463
(58) Field of Classification Search ............... 382/274, 382/275, 282; 358/274, 275, 463
See application file for complete search history.

(56) References Cited

U.S. PATENT DOCUMENTS

| | | | |
|---|---|---|---|
| 5,673,336 A * | 9/1997 | Edgar et al. ................ | 382/167 |
| 5,850,472 A * | 12/1998 | Alston et al. ............... | 382/162 |
| 6,122,408 A | 9/2000 | Fang et al. | |
| 6,445,812 B1 | 9/2002 | Lai et al. | |
| 6,817,982 B2 * | 11/2004 | Fritz et al. ................... | 600/443 |
| 7,020,345 B2 | 3/2006 | Tsai et al. | |
| 7,972,266 B2 * | 7/2011 | Gobeyn et al. .............. | 600/301 |
| 8,000,556 B2 * | 8/2011 | Li et al. ..................... | 382/275 |

OTHER PUBLICATIONS

Huang, Y-S, et al., The Illumination Compensation Method for Face Recognition, International Conference on Digital Content, Dec. 2009, Chung-Li, Taiwan, R.O.C.

* cited by examiner

*Primary Examiner* — Yosef Kassa
(74) *Attorney, Agent, or Firm* — Ming Chow; Sinorica, LLC

(57) ABSTRACT

The present invention provides a method for extracting an image texture signal, a method for identifying image and a system for identifying an image. The method for extracting an image texture signal comprises the following steps: extracting a first image signal; employing a first operation procedure to the first image signal to obtain a second image signal; employing a second operation procedure to the second image signal to obtain a third image signal; employing a third operation procedure to the third image signal to obtain a fourth image signal; outputting the fourth image signal. Therefore, the first image signal is transformed to the fourth image signal via the method for extracting an image texture signal.

18 Claims, 6 Drawing Sheets

METHOD AND SYSTEM FOR IMAGE EXTRACTION AND IDENTIFICATION

BACKGROUND OF THE INVENTION

1. Technical Field

The present invention relates to a method for identifying image, and more particularly, to an illumination compensation method with high image recognition accuracy.

2. Description of Related Art

In recent years, digital video signal processing is very popular because digital audio and video technology have made a lot of progress, the price of large data storage is lower and the cost of the optical photographic equipments also decreases. Most importantly, artificial intelligence and computer vision technology are getting mature. So intelligent video processing systems gain much attention to the public, especially it has become a very important role in the safety monitoring field. In this field, the accuracy of face recognition is an essential goal to pursue, so the present invention addresses this issue here, and provides a high accuracy of face recognition.

For face recognition, there are several problems which will affect the recognition accuracy. Among them, ambient lighting variation is a very crucial problem because it will affect the system performance considerably. Currently, most face recognition methods of the prior arts assume that human face images are taken under uniform illumination, but in fact the background illumination is usually non-uniform and even unstable. Therefore, the face images of the same person often have very different appearances which make face recognition very difficult. Furthermore, slanted illumination probably produces different shadows on face images which may reduce the recognition rate greatly. So the present invention focuses on this topic and provides an illumination compensation method to improve the recognition accuracy under different background illumination.

U.S. Pat. No. 6,122,408 discloses a method for normalizing the lighting changes in an input image having various illuminating intensities. The method filters the input image through a low-pass filter to provide a background estimation, and then employs an adaptive local histogram modification with background estimation as a preprocessing step of the input image. However, the recognition accuracy of this method is only 76.6%, which is not accurate enough for face recognition.

Moreover, U.S. Pat. No. 6,445,812 discloses an illumination compensation system for correcting smooth intensity variations due to illumination changes is based on an assumption that an underlining image reflectance function is approximately a piecewise constant and that an image irradiance function is spatially smooth. The system first takes the logarithm of an image brightness function. Gradient constraints are then computed using a finite difference. Nevertheless, the face images are not smooth images, thus making the face images of the same person often have very different appearances. Accordingly, the bias of the evaluation of the recognition rates in this method would be remarkably enhanced. In addition, the performance of the evaluation of the recognition rates of this method are not provided and thus the recognition accuracy of this method remains unknown.

Furthermore, U.S. Pat. No. 7,020,345 discloses a method for illuminant compensation of an image of a human face, wherein the image includes a plurality of color pixels. This method adopts the assumption recited in U.S. Pat. No. 6,445,812, nevertheless, the face images are not smooth images, thus making the face images of the same person often have very different appearances. Therefore, the recognition accuracy of this method is only 81.7%.

SUMMARY OF THE INVENTION

To overcome the shortcomings of the prior arts mentioned above, the present invention provides a method for extracting an image texture signal, which comprises the steps of:

extracting a first image signal, the first image signal is formed by the multiplication product of a first low-frequency illuminance signal and a first high-frequency texture signal;

obtaining a second image signal by applying a first operation procedure to the first image signal, the second image signal comprising a second low-frequency illuminance signal and a second high-frequency texture signal, wherein the intensity of the second low-frequency illuminance signal is lower than the intensity of the first low-frequency illuminance signal and the intensity of the second high-frequency texture signal is not lower than the intensity of the first high-frequency texture signal;

obtaining a third image signal by applying a second operation procedure to the second image signal, the third image signal having a third high-frequency texture signal, wherein the intensity of the third high-frequency texture signal is not lower than the intensity of the second high-frequency texture signal, the third high-frequency texture signal further comprising a first noise signal;

obtaining a fourth image signal by applying a third operation procedure to the third image signal, the fourth image signal having a fourth texture signal, the fourth texture signal further comprising a second noise signal, wherein the intensity of the second noise signal of the fourth texture signal is lower than the intensity of the first noise signal of the third high-frequency texture signal; and outputting the fourth image signal, whereby the first image signal is transformed through the method for extracting the image texture signal to become an extracted texture signal, wherein the fourth image signal is thereby defined as the extracted texture signal.

Accordingly, the primary object of the present invention is to provide a method for extracting an image texture signal. The second image signal is obtained by applying the Homomorphic Filtering process of the first operation procedure to the first image signal. Therefore, the intensity of the second low-frequency illuminance signal is lower than the intensity of the first low-frequency illuminance signal. In addition, the intensity of the second high-frequency texture signal is not lower than the intensity of the first high-frequency texture signal. In other words, the Homomorphic Filtering process of the first operation procedure is able to reduce the intensity of the first low-frequency illuminance signal of the first image signal and strengthen the intensity of the first high-frequency texture signal of the first image signal.

Another object of the present invention is to provide a method for extracting an image texture signal. The third image signal is obtained by applying the Ratio Image Generation process of the second operation procedure to the second image signal. Therefore, the intensity of the third high-frequency texture signal is not lower than the intensity of the second high-frequency texture signal. In other words, the Ratio Image Generation process of the second operation procedure is able to strengthen the intensity of the second high-frequency texture signal of the second image signal.

Yet another object of the present invention is to provide a method for extracting an image texture signal. The fourth image signal is obtained by applying the Anisotropic Smoothing process of the third operation procedure to the third image signal. Therefore, the intensity of the second noise signal of the fourth texture signal is lower than the intensity of the first noise signal of the third high-frequency texture signal. In other words, Anisotropic Smoothing process of the third operation procedure is able to reduce the intensity of the first noise signal of the third high-frequency texture signal.

Additionally, the present invention provides a method for identifying image.

Accordingly, another object of the present invention is to provide a method for identifying image which comprises the steps of: providing at least one reference image; obtaining a reference texture image by applying a method for extracting an image texture signal to the reference image; providing an identification image; obtaining an identification texture image by applying the method for extracting an image texture signal to the identification image; and comparing the identification texture image with the reference texture image and then applying a recognition procedure to the identification texture image and the reference texture image to obtain an image recognition rate.

Moreover, the present invention provides a system for identifying an image.

Accordingly, another object of the present invention is to provide a system for identifying an image which comprises a reference image database for storing a plurality of reference images; an image data inputting module for receiving at least one identification image; an image operation module for providing a method for extracting an image texture signal, the image operation module transforming the plurality of reference images stored in the reference image database to a plurality of reference texture images and transforming the identification image to an identification texture image; a reference texture image database for storing the plurality of reference texture images; an identification texture image database for storing the identification texture image; a recognition module for providing a recognition procedure to compare the identification texture image with each of the reference texture images, thereby obtaining a plurality of image recognition rates, wherein each of the image recognition rate is of the identification texture image and each of the reference texture images; and an outputting module for outputting the recognition rates, in which the recognition rates are sequenced in order from high to low. A high accuracy of a system for identifying an image is thereby provided.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Some particular embodiments of the invention will be described in detail for purpose of illustration, and one of ordinary skill in the art can easily understand the advantages and efficacy of the present invention through the disclosure of the specification. It is to be understood that alternative embodiments may be possible for the implement and application of the present invention while numerous variations will be possible to the details disclosed in the specification on the strength of diverse concepts and applications without going outside the scope of the invention as disclosed in the claims.

Figure 1:
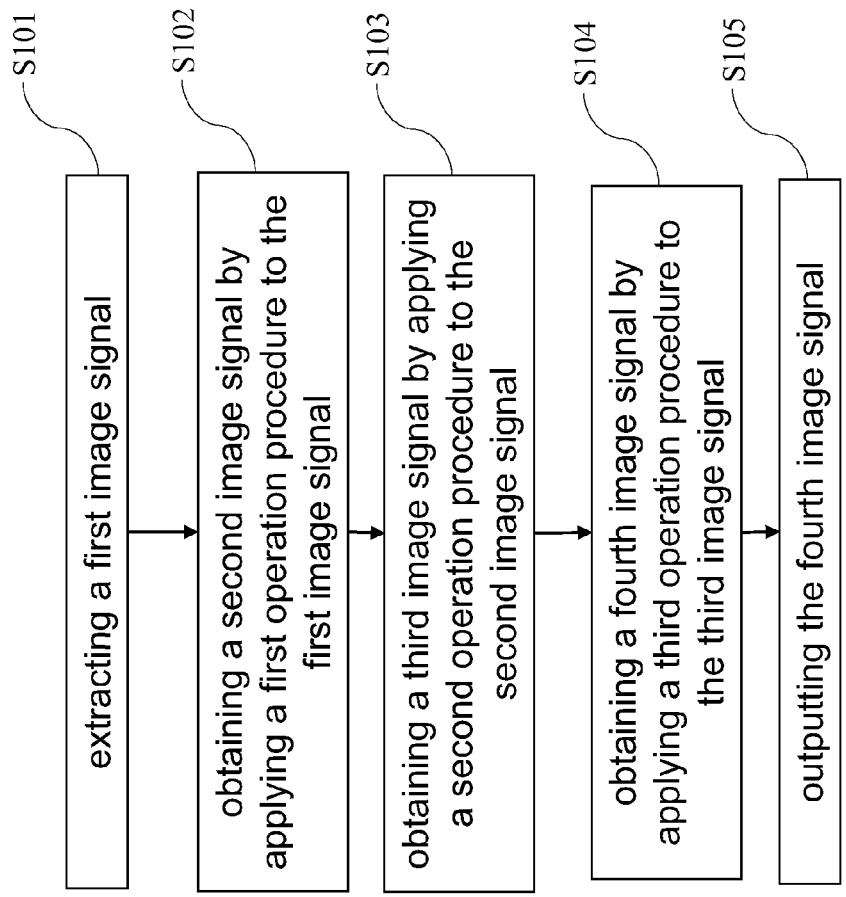
FIG. 1 is a flowchart illustrating a method for extracting an image texture signal according to the first preferred embodiment of the present invention.
Figure 5:
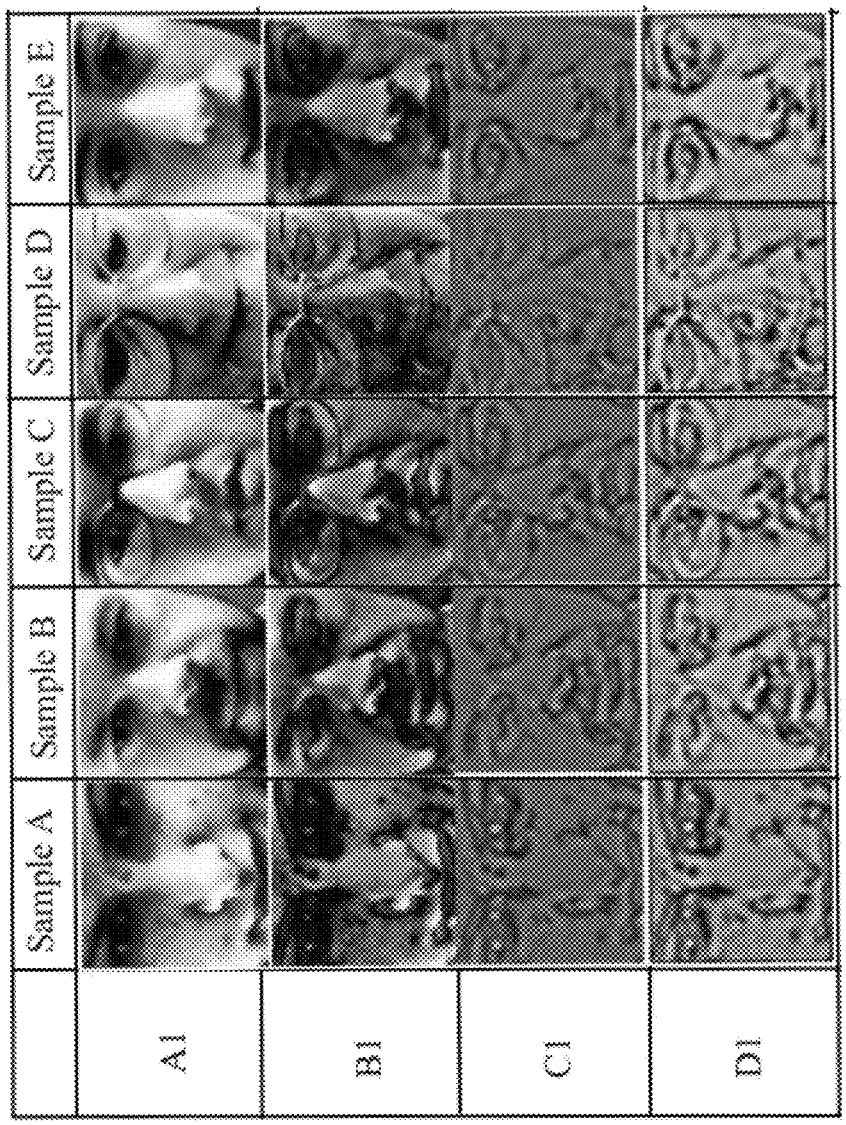
FIG. 5 is an experimental example 1 of the present invention.
Figure 6:
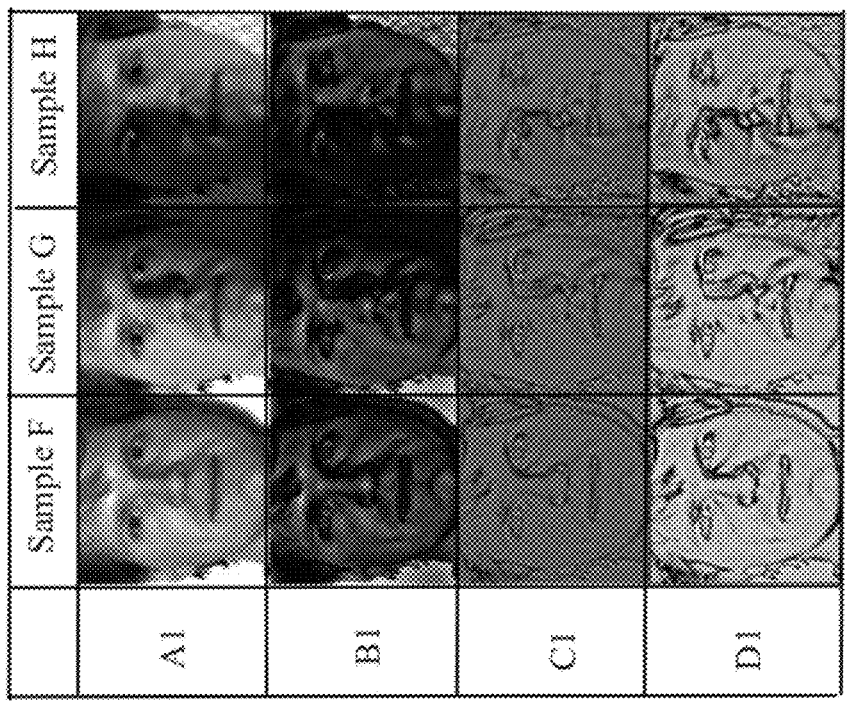
FIG. 6 is an experimental example 3 of the present invention.

Please refer to FIG. 1, FIG. 5 and FIG. 6. Specifically, FIG. 1 is a flowchart illustrating a method for extracting an image texture signal 1000 according to the first preferred embodiment of the present invention.

First, in the step S101, an image extraction device (not shown in figure) was used to extract the first image signal A1. The first image signal A1 is formed after multiplying the first low-frequency illuminance signal with the first high-frequency texture signal. Based on the principle of imaging, the Lambertian model, (x, y) is assumed to represent the location coordinate of an image pixel. The first image signal A1 uses a first function to represent the single-channel image value of the image pixel (x, y). The first function $f(x, y)$ is represented by the multiplication product of a second function $i(x, y)$ and a third function $r(x,y)$, which is $f(x, y)=i(x,y)r(x,y)$. It should be understood that the above single-channel image value of the image pixel (x, y) can be a gray scale value of the image pixel (x, y), a monochrome value of the image pixel (x, y), or an illuminance value of the image pixel (x, y). In addition, the aforementioned first low-frequency illuminance signal is denoted by the second function $i(x, y)$ while the aforementioned first high-frequency texture signal is denoted by the third function $r(x, y)$.

Specifically, the aforementioned first low-frequency illuminance signal, $i(x, y)$, is the illuminance received by the image pixel (x, y). The first high-frequency texture signal, $r(x, y)$, is the reflectance that shows the contrast arrangement of different composite materials at the image pixel (x, y). In general, the illuminance values received by neighboring image pixels are similar to each other. The illuminance values of image pixels further away from each other can vary a lot, but these differences are gradual. Therefore, the first low-frequency illuminance signal $i(x, y)$ is regarded as one kind of low-frequency signal in the image pixel (x, y). Moreover, the reflectance reveals apparent contrasting texture graphics resulting from close arrangements of elements of different composite materials (e.g. parts of a human facial, including skin, eyebrows, eyes, and lips). Therefore, the first high-frequency texture signal $r(x, y)$ is regarded as a high-frequency signal that can reflect texture information.

Secondly, in the step S102, based on the above-mentioned principle, a first operation procedure is applied to the first image signal A1, to obtain a second image signal B1, wherein the first operation procedure is a Homomorphic Filtering process. The second image signal B1 is formed after multiplying a second low-frequency illuminance signal with a second high-frequency texture signal. In this preferred embodiment, the second image signal B1 is denoted by a ninth function, $g(x, y)=i_0(x, y)r_0(x, y)$, wherein the aforementioned second low-frequency illuminance signal is denoted by a second function $i_0(x, y)$ while the aforementioned second high-frequency texture signal is denoted by a third function $r_0(x, y)$. Accordingly, after the first image signal A1 was processed with the Homomorphic Filtering process of the first operation procedure, the second image signal B1 was obtained, thus making the intensity of the second low-frequency illuminance signal $i_0(x, y)$ of the second image signal B1 lower than the intensity of the first low-frequency illuminance signal $i(x, y)$ of the first image signal A1. In addition, the intensity of the second high-frequency texture signal $r_0(x, y)$ of the second image signal B1 is not lower than the intensity of the first high-frequency texture signal $r(x, y)$ of the first image signal A1. In other words, the Homomorphic Filtering process of the first operation procedure is able to reduce the intensity of the first low-frequency illuminance signal $i(x, y)$ of the first image signal A1 and strengthen the intensity of the first high-frequency texture signal $r(x, y)$ of the first image signal A1.

In actual situations, however, images would be influenced by many conditions and factors, such as the angle of an image and the changes of light. This would cause a great deal of noise to occur in the obtained first image signal A1. The purpose of the aforementioned Homomorphic Filtering process in the first operation procedure is to adjust the range of the single-channel image values of the first image signal A1 including the gray scale value, the monochrome value, or the illuminance value. Therefore, the image details of the dark areas in the first image signals A1 are strengthened and at the same time the image details in the light area of the first image signal A1 are avoid being lost.

The details of the steps in the Homomorphic Filtering process of the first operation procedure are described as follows:

First, adopting a logarithmic operation to the first function $f(x, y)$ to obtain a fourth function $Z(x, y) = \ln f(x, y) = \ln i(x, y) + \ln r(x, y)$, hence separating the first low-frequency illuminance signal $i(x, y)$ from the first high-frequency texture signal $r(x, y)$.

Next, adopting a Fourier Transform operation to the left and right sides of the fourth function to obtain a fifth function $Z(u, v) = F_i(u, v) + F_r(u, v)$, wherein $Z(u, v)$, $F_i(u, v)$, and $F_r(u, v)$ are respectively the Fourier Transform result of $Z(x, y)$, $\ln i(x, y)$, and $\ln r(x, y)$.

Next, providing a sixth function, $H(u, v)$, which is a low frequency filtering function. The sixth function $H(u, v)$ is multiplied by the fifth function $Z(u, v)$ and a seventh function, $S(u, v) = H(u, v)Z(u, v) = H(u, v)F_i(u, v) + H(u, v) F_r(u, v)$, is thereby obtained.

Next, adopting an inverse Fourier Transform operation to the seventh function $S(u, v)$ to obtain an eighth function $SS(x, y)$, which is $$SS(x, y) = F^{-1}\{S(u, v)\}$$
$$= F^{-1}\{H(u, v)F_i(u, v)\} + F^{-1}\{H(u, v)F_r(u, v)\}$$
$$= i'(x, y) + r'(x, y),$$

wherein $i'(x, y) = F^{-1}\{H(u, v)F_i(u, v)\}$,
$r'(x, y) = F^{-1}\{H(u, v)F_r(u, v)\}$.

Finally, adopting an exponential operation to the eighth function $SS(x, y)$ to obtain a ninth function, which is $$g(x,y) = e^{SS(x,y)} = e^{\{i'(x,y) + r'(x,y)\}} = e^{i'(x,y)}e^{r'(x,y)} = i_0(x,y)r_0(x, y),$$

wherein the ninth function is thereby defined as the second image signal B1 that is obtained from the step S102 of this preferred embodiment.

Figure 2:
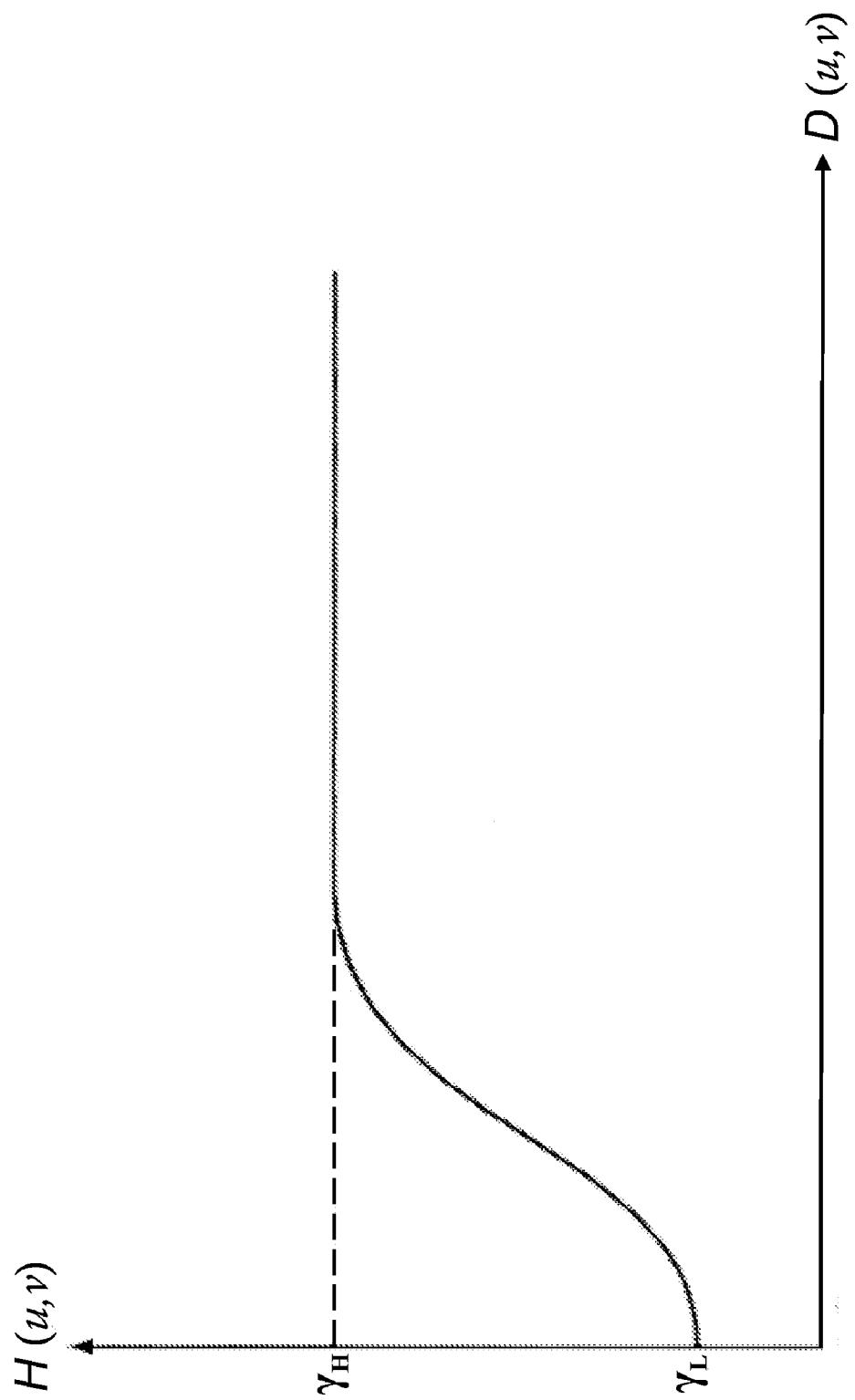
FIG. 2 is a schematic diagram illustrating the sixth function in the step S102 according to the first preferred embodiment of the present invention.

Please refer to FIG. 2, which is a schematic diagram of the above-mentioned sixth function $H(u, v)$ in the above-mentioned step S102 according to the first preferred embodiment. The sixth function $H(u, v)$ is designed in the step S102 of this invention. The sixth function is denoted by $H(u, v) = (r_H - r_L)[1 - e^{-c[D^2(u,v)/D_0^2]}] + r_L$, wherein $r_L$ is set as a primary control parameter for the retention level of the first low-frequency illuminance signal $i(x, y)$ in the first image signal A1, and $r_L < 1$. The lower the $r_L$, the higher the suppression level of the first low-frequency illuminance signal $i(x,y)$ in the first image signal A1. In addition, $r_H$ is set as a reinforced control parameter of the first high-frequency texture signal in the first image signal A1, wherein $r_H > 1$. Moreover, $D_0$ is a cut-off frequency, and the constant c is a control parameter of the increased level of the exponential function. The sixth function $H(u, v)$ described herein is a low-frequency filtering function and therefore, the sixth function $H(u, v)$ would decrease the intensity of the first low-frequency illuminance signal $i(x,y)$ of the first image signal A1, hence making the intensity of the second low-frequency illuminance signal $i_0(x, y)$ of the second image signal B1 lower than the intensity of the first low-frequency illuminance signal $i(x, y)$ of the first image signal A1.

Through the Homomorphic Filtering process of the first operation procedure, the obtained intensity of the second high-frequency texture signal $r_0(x, y)$ of the second image signal B1 is not lower than the intensity of the first high-frequency texture signal $r(x, y)$ of the first image signal A1. Therefore, the second image signal B1 can not only effectively preserve the most important high-frequency information in image recognition, which is corresponding to the increase of the first high-frequency texture signal $r(x, y)$ of the first image signal A1, but also reduce the impact caused by the changes in light.

Based on the principle of imaging according to the Lambertian model, the present invention supposes that $(x, y)$ represents a location coordinate of an image pixel in the second image signal B1, which is denoted by the above-mentioned ninth function $g(x, y)$, and that $I(x, y)$ is a single-channel image value of the image pixel $(x, y)$. The aforementioned single-channel image value can be a gray scale value, a monochrome value, or an illuminance value. Additionally, the present invention supposes that $\rho(x, y)$ is the albedo of the image pixel $(x, y)$, $n(x, y)$ is a normal vector of the image pixel $(x, y)$, and $s(x, y)$ is a light illumination vector of the image pixel $(x, y)$ captured with a single light source.

In general, $\rho(x, y)$ reflects the texture of the image pixel $(x, y)$. Accordingly, the relationship between aforementioned variables is $I(x, y) = \rho(x, y)n^T(x, y) \cdot s(x, y)$, wherein $n^T(x, y) \cdot s(x, y)$ is regarded as an extrinsic factor of forming the single-channel image value, which can be a gray scale value, a monochrome value, or an illuminance value. Besides, $\rho(x, y)$ is regarded as an intrinsic factor of forming a single-channel image value, which can be a gray scale value, a monochrome value, or an illuminance value.

The aforementioned inference is also suitable for images captured in an environment with multiple light sources. Therefore, the relationship between aforementioned variables is then denoted as $$I(x,y) = \rho(x,y)\Sigma_i n^T(x,y) \cdot s_i(x,y),$$

wherein $s_i(x, y)$ is a light illumination vector of the ith light source of the image pixel $(x, y)$. To remove $\Sigma_i n^T(x, y) \cdot s_i(x, y)$ from the second image signal B1 successfully, this preferred embodiment applies two hypotheses concerning the basic properties of images. On one hand, the first hypothesis is to propose that the extrinsic factor corresponds primarily to the low-frequency information of the second image signal B1. On the other hand, the second hypothesis is to propose that the intrinsic factor corresponds primarily to the high-frequency information of the second image signal B1. In other words, the low-frequency information of the second image signal B1 changes due to being more easily influenced by light factors, whereas the high-frequency information (e.g. the facial contours or the edges of human facial features) of the second image signal B1 is less easily influenced by the light factors.

Thirdly, in the step S103, based on the above-mentioned principle, a second operation procedure is applied to the second image signal B1 to obtain a third image signal C1, wherein the second operation procedure is a Ratio Image Generation process. The third image signal C1 includes a third high-frequency texture signal. After the second image signal B1 is processed using the Ratio Image Generation process of the second operation procedure, the third image signal C1 is obtained, wherein the intensity of the third high-frequency texture signal of the third image signal C1 is not lower than the intensity of the second high-frequency texture signal of the second image signal B1, which means that by the Ratio Image Generation process, the second high-frequency texture signal $r_0(x, y)$ of the second image signal B1 can be strengthened.

The steps of the Ratio Image Generation process of the second operation procedure are described in detail as the following:

First, a tenth function is defined and denoted by $W(x, y)$, wherein the tenth function $W(x, y)$ is the comprehensive sum of light-related factors of the image pixels in the second image signal B1. It should be noted that the tenth function $W(x, y)$ and the above-mentioned second low-frequency illuminance signal $i_0(x, y)$ are both comprehensive sum of light-related factors of the image pixels in the second image signal B1.

Next, an eleventh function is defined and denoted by $\tilde{W}(x, y)$ and $\tilde{W}(x, y)=I(x, y)*G$, wherein $I(x, y)=\rho(x, y)\Sigma_i n^T(x, y) \cdot s_i(x, y)=\rho(x, y)W(x, y)$ is a twelfth function, "*" is a convolution operator, and G represents a Gaussian function. The eleventh function $\tilde{W}(x, y)$ is obtained by convoluting the twelfth function $I(x, y)$ with the Gaussian function. Following the above-mentioned points concerning the principle of imaging according to the Lambertian model, to remove $\Sigma_i n^T(x, y) \cdot s_i(x, y)$ from the tenth function successfully, this preferred embodiment applies two hypotheses regarding the basic properties of images. The first hypothesis is to propose that the extrinsic factor corresponds primarily to the low-frequency information of the tenth function $W(x, y)$. The second hypothesis is to propose that the intrinsic factor corresponds primarily to the high-frequency information of the tenth function $W(x, y)$. In other words, the low-frequency information of the tenth function $W(x, y)$ changes due to being more easily influenced by the light factors. However, the high-frequency information of the tenth function $W(x, y)$, such as facial contours or the edges of human facial features is not easily influenced by the light factors.

Next, a relationship between the tenth function and the eleventh function defining is defined. Basically, the lighting factors can be implicitly attributed to the tenth function $W(x, y)$ as recited above. Because both of the twelfth function $I(x, y)$ and the tenth function $W(x, y)$ correspond to the light-related low-frequency image factors that influence the image pixel $(x, y)$ in the second image signal B1, this preferred embodiment thus use $\tilde{W}(x, y) \approx cW(x, y)$ to define an approximate relationship between the tenth function and the eleventh function, in which c is a constant value.

Finally, a thirteenth function is defined and denoted by $N(x, y)$ and $$N(x, y) = \frac{I(x, y)}{\tilde{W}(x, y)}$$
$$= \frac{\rho(x, y)W(x, y)}{\tilde{W}(x, y)}$$
$$\approx c\rho(x, y),$$

wherein the thirteenth function $N(x, y)$ is the ratio of the twelfth function $I(x, y)$ and the eleventh function $\tilde{W}(x, y)$. Accordingly, the thirteenth function is thereby defined as the third image signal C1 that is obtained from the step S103 of this preferred embodiment. In addition, the third image signal C1 strengthens the intensity of the third high-frequency texture signal of the third image signal C1.

Although the third image signal C1 strengthens and inherently reveals the intensity of the third high-frequency texture signal of the third image signal C1, the third high-frequency texture signal of the third image signal C1 further includes a first noise signal. Since the third image signal C1 is still quite sensitive to the first noise signal, the intensity of the first noise signal of the third image signal C1 could possibly be strengthened.

Although the general smoothing algorithms disclosed in the prior arts reduced the intensity of the aforementioned first noise signal of the third high-frequency texture signal, the third high-frequency texture signal of the third image signal C1 processed by these general smoothing algorithms would be undermined, and therefore the normal texture information of the third image signal C1 would be degenerated.

To decrease the intensity of the first noise signal of the third high-frequency texture signal and to prevent the third high-frequency texture signal of the third image signal C1 from being undermined and degenerated, this preferred embodiment applies a third operation procedure to the third image signal C1 to obtain a fourth image signal D1 that is characteristically smoother.

Fourthly, for this reason, in step S104, a third operation procedure is applied to the third image signal C1 to obtain the fourth image signal D1, wherein the third operation procedure is an Anisotropic Smoothing process. The fourth image signal D1 comprises a fourth texture signal, wherein the fourth texture signal further comprises a second noise signal. After the fourth image signal D1 is processed with the an Anisotropic Smoothing process of the third operation procedure, the fourth image signal D1 is obtained, wherein the intensity of the second noise signal of the fourth texture signal is lower than the intensity of the above-mentioned first noise signal of the third texture signal.

The details of the steps in Anisotropic Smoothing process of the third operation procedure are described as follows:

First, some variables for the Anisotropic Smoothing process are defined as below:

$N(x, y)$ is defined as a single-channel image value of an image pixel of the coordinates $(x, y)$ in the third image signal C1;

$\Delta_E$ is defined as a difference in single-channel image values between the image pixel of the coordinates $(x, y)$ and an image pixel of the coordinates $(x+1, y)$ in the third image signal;

$\Delta_W$ is defined as a difference in single-channel image values between the image pixel of the coordinates (x, y) and an image pixel of the coordinates (x−1, y) in the third image signal;

$\Delta_S$ is defined as a difference in single-channel image values between the image pixel of the coordinates (x, y) and an image pixel of the coordinates (x, y+1) in the third image signal;

$\Delta_N$ as a difference in single-channel image values between the image pixel of the coordinates (x, y) and an image pixel of the coordinates (x, y−1) in the third image signal.

It should be understood that the aforementioned single-channel image value can be a gray scale value, a monochrome value, or an illuminance value.

Next, when conducting the Anisotropic Smoothing process, a large degree of smoothing process will be executed on the uniform parts of image, but a much small degree of smoothing process will be executed on the boundary of image. Consequently, the smoothed third image signal C1 will preserve its boundary information effectively. To serve this purpose, this preferred embodiment defines a fourteenth function $w_k$ and $$w_k = \exp^{-\frac{\Delta_k \cdot \Delta_k}{\delta}} \text{ for } k \in \{E, W, S, N\},$$

wherein the fourteenth function $w_k$ is a weighting function and $\delta$ is a bandwidth parameter.

Finally, the Anisotropic Smoothing process is applied with the fourteenth function, $w_k$, for t times. The fourth image signal D1 is obtained accordingly, wherein the fourth image signal D1 is represented by $$g_{x,y}{}^t = g_{x,y}{}^{t-1} + \lambda(w_E g_{x+1,y} + w_W g_{x-1,y} + w_S g_{x,y+1} + w_N g_{x,y-1})$$

, wherein the value t is not lower than 1.

Finally, in step S105, the fourth image signal D1 is outputted. Thus, the first image signal A1 is transformed to the extracted texture signal E1 through the method for extracting the image texture signal 1000, wherein the fourth image signal D1 is thereby defined as the extracted texture signal E1.

Figure 3:
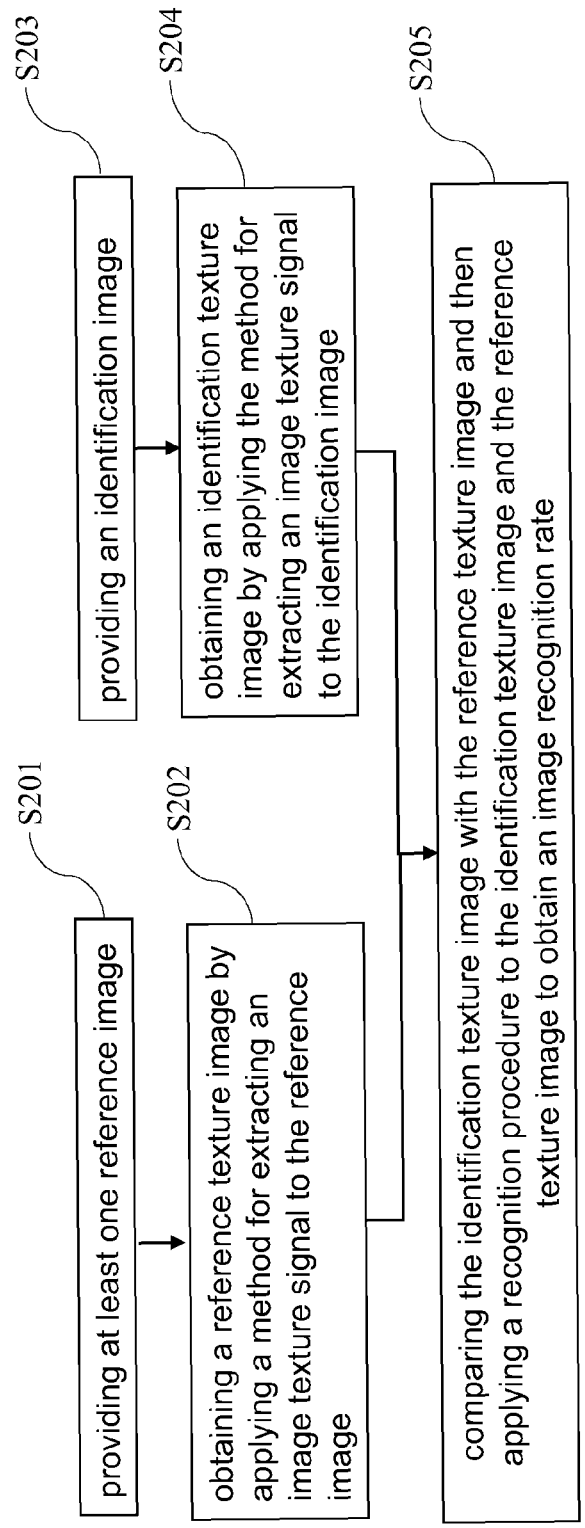
FIG. 3 is a flowchart illustrating a method for identifying image according to the second preferred embodiment of the present invention.

Please refer to FIG. 3, which is a flowchart illustrating a method for identifying image 2000 according to the second preferred embodiment of the present invention. The steps of the method for identifying image 2000 are described in detail as follow:

Step S201: providing at least one reference image R1;

Step S202: obtaining a reference texture image R2 by applying a method for extracting an image texture signal 1000 to the reference image R1, wherein the characteristics and the features of the method for extracting an image texture signal 1000 are substantially the same as those recited in the first preferred embodiment;

Step S203: providing an identification image M1;

Step S204: obtaining an identification texture image M2 by applying a method for extracting an image texture signal 1000 to the identification image M1, wherein the characteristics and the features of the method for extracting an image texture signal 1000 are substantially the same as those recited in the first preferred embodiment; and Step S205: comparing the identification texture image M2 with the reference texture image R2 and then applying a recognition procedure MP1 to the identification texture image M2 and the reference texture image R2 to obtain an image recognition rate G1.

Specifically, the recognition procedure MP1 can be a constrained mutual subspace (hereinafter abbreviated as CMSM) method, a RAW method, or a generalized discriminant analysis (hereinafter abbreviated as GDA) method. The CMSM method constructs a class subspace for each person and makes the relation between class subspaces by projecting them onto a generalized difference subspace so that the canonical angles between subspaces are enlarged to approach to the orthogonal relation. For the RAW method, it refers to the nearest-neighbor classification based on the image value in the Euclidean distance metric. The GDA method adopts the kernel function operator to make it easy to extend and generalize the classical Linear Discriminant Analysis to a non-linear one. It should be noted that the recognition procedures MP1 adopted in this preferred embodiment are not limited by the three types described above. The three types of the recognition procedures MP1, however, are the preferred ones in this preferred embodiment.

Figure 4:
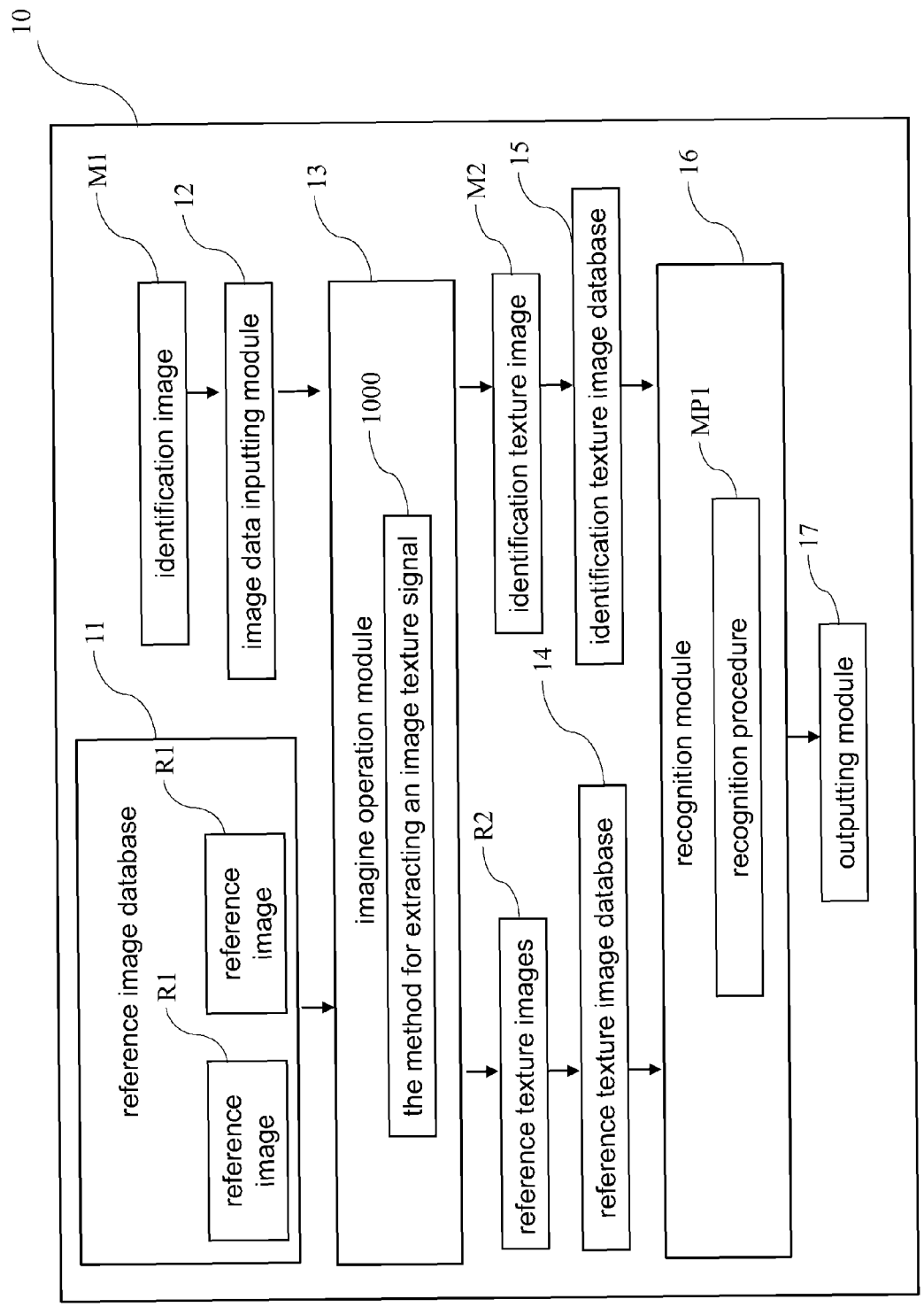
FIG. 4 is a functional block diagram illustrating a system for identifying an image according to the third preferred embodiment of the present invention.

Please refer to FIG. 4, which is a functional block diagram of a system for identifying an image 10 according to the third preferred embodiment of the present invention.

A system for identifying an image 10 comprises a reference image database 11, an image data inputting module 12, an image operation module 13, a reference texture image database 14, an identification texture image database 15, a recognition module 16, and an outputting module 17. The reference image database 11 is provided for storing a plurality of reference images R1; the image data inputting module 12 is provided for receiving at least one identification image; the image operation module 13 is used for providing a method for extracting an image texture signal 1000. Accordingly, the image operation module 13 implemented with the method for extracting an image texture signal 1000 is able to transform the plurality of reference images R1 stored in the reference image database 11 to a plurality of reference texture images R2 and to transform the identification image M1 to an identification texture image M2. It should be noted that the characteristics and the features of the method for extracting an image texture signal 1000 are substantially the same as those recited in the first preferred embodiment. For the reference texture image database 14, it is provided for storing the plurality of reference texture images R2; the identification texture image database 15 is provided for storing the identification texture image M2; the recognition module 16 is used for providing a recognition procedure MP1 to compare the identification texture image M2 with each of the reference texture image R2, thereby obtaining an image recognition rate G1 of the identification texture image M2 and each of the reference texture image R2; the outputting module 17 is provided for outputting the image recognition rates G1, in which the image recognition rates G1 are sequenced in order from high to low. It should be noted that the aforementioned recognition procedure MP1 can be a constrained mutual subspace (hereinafter abbreviated as CMSM) method, a RAW method, or a generalized discriminant analysis (hereinafter abbreviated as GDA) method. Specifically, the recognition procedures MP1 adopted in this preferred embodiment are not limited by the three types described above. The three types of the recognition procedures MP1, however, are the preferred ones in this preferred embodiment.

To further demonstrates the efficacy of and the system for identifying an image 10, implemented with the method for extracting an image texture signal 1000 and the method for identifying image 2000, of the present invention, four experimental examples are provided below.

Experimental Example 1

Please refer to FIG. 4, FIG. 5 and Table 1. The Experimental Example 1 of the present invention adopts the face images of 40 persons to evaluate the recognition rate of the system for identifying an image 10. The face images are retrieved under the topic of "C-Controlled" in the BANCA database, a famous face images databases, which contains human frontal face images grabbed from several sections to reflect different variation factors. Among all sections, four sections, the section 1, 2, 3 and 4, of the "C-Ccontrolled" classification in the BANCA database are used in the Experimental Example 1 of the present invention. Specifically, for said four sections in this Experimental Example 1, image extraction is conducted at four different times. The objective environmental factors, including the background and the change of light during image extraction, are the same. In each section, there are 10 images for each person, and in total there are 40 persons, therefore it consists of 1600 images in total. By randomly separating the 40 persons, different enrollment and unenrollment sets are constructed. Among the four sections recited above, only one section is used for serving the training purpose, and the other three sections are for testing. Accordingly, 400 images of one of the four sections are regarded as the reference images R1. These 400 reference images R1 are then transformed to the 400 reference texture images R2 via the image operation module 13 implemented with the method for extracting an image texture signal 1000. The obtained 400 reference texture images R2 are then stored in the reference texture image database 14. The rest of 1200 images of the other three of the four sections are regarded as the identification images M1. These 1200 identification images M1 are then transformed to the 1200 identification texture images M2 via the image operation module 13 implemented with the method for extracting an image texture signal 1000. The obtained 1200 identification texture images M2 are then stored in the identification texture image database 15.

To further evaluates the recognition rates G1 of the method for extracting an image texture signal 1000, the Experimental Example 1 adopts the recognition module 16, which is used for providing a recognition procedure MP1, to compare the identification texture image M2 with each of the reference texture images R2, thereby obtaining an image recognition rate G1 of the identification texture image M2 and each of the reference texture images R2. Specifically, the aforementioned recognition procedure MP1 can be the CMSM method, the RAW method, or the GDA method, as those recited in the second and the third preferred embodiment of the present invention.

The parameters used by the Experimental Example 1 are concretely set as the following:

The parameters of the sixth function, $H(u, v)=(r_H-r_L)[1-e^{-c[D^2(u,v)/D_0^2]}]+r_L$, in the Homomorphic Filtering process of the first operation procedure are $r_H=1.6$, $r_L=0.5$, and $D_0=15$. When the recognition procedure MP1 is the CMSM method, the base number is set as 1000; when the recognition procedure MP1 is the GDA method, then the kernel sigma is 4400 and the feature dimension is 200. Accordingly, the obtained image recognition rates G1 are outputted via the outputting module 17, in which the image recognition rates G1 are sequenced in order from high to low.

Please refer to FIG. 5, which shows the five samples, including sample A, sample B, sample C, sample D, and sample E, randomly drawn from the 1200 identification images M1 and the 1200 identification texture images M2. Each identification image M1 is the facial image sample of the topic, "C-Controlled," collected from the BANCA database. Through the image data inputting module 12, each identification image M1 is extracted and obtained as the first image signal A1 of each sample. After the first image signal A1 of each sample is processed with the method for extracting an image texture signal 1000 implemented in the image operation module 13, the second image signal B1, the third image signal C1 and the fourth image signal D1 are obtained as shown in FIG. 5.

Specifically, in step S105 of the first preferred embodiment, the fourth image signal D1 is defined as the extracted texture signal E1. In addition, based on the third preferred embodiment, image operation module 13 is implemented with the method for extracting an image texture signal 1000, wherein the characteristics and the features of the method for extracting an image texture signal 1000 are substantially the same as those recited in the first preferred embodiment. Accordingly, the identification image M1 is transformed to the identification texture image M2 via the image operation module 13 implemented with the method for extracting an image texture signal 1000 in the third preferred embodiment. Therefore, the fourth image signal D1 of each said sample of this Experimental Example 1 is not only regarded as the identification texture image M2 as defined in the third preferred embodiment, but also regarded as the extracted texture signal E1 as defined in the first preferred embodiment.

As shown in Table 1, the recognition rates G1 of each of samples in the Experiment Example 1 are evaluated via the recognition procedure MP1, including the CMSM method, the RAW method and the GDA method respectively, implemented in the recognition module 16. The image recognition rates G1 obtained through the CMSM method, the RAW method and the GDA method are 95.1%, 92.6%, and 93.4%, respectively, which are all greater than 90%. When the recognition procedure MP1 is the CMSM method, the image recognition rates G1 is even as high as 95.1%, thus demonstrating that the present invention can obtain image recognition rates G1 with high accuracy through the combination of the method for extracting an image texture signal 1000, the method for identifying image 2000, and the system for identifying an image 10.

TABLE 1

| recognition procedure MP1 | CMSM | RAW | GDA |
|---|---|---|---|
| image recognition rates G1 | 95.1% | 92.6% | 93.4% |

Experimental Example 2

Please refer to FIG. 4 and Table 2. The characteristics and the features of the system for identifying an image 10 adopted in the Experimental Example 2 are substantially the same as those recited in the Experimental Example 1. The Experimental Example 2, compared with the Experimental Example 1, the image operation module 13 is not only implemented with the method for extracting an image texture signal 1000, but also implemented with other five different illumination compensation methods. Accordingly, the illumination compensation methods adopted in the Experimental Example 2 are recited as follow (1) Method A is the method for extracting an image texture signal 1000 which is as the same as that recited in the Experimental Example 1.
(2) Method B is a Histogram equalization method.
(3) Method C is a Retinex method, which is an algorithm to simulate human vision which main concept is the perception of the human eye will be affected by the object reflectance spectra and the surrounding lighting source.

(4) Method D is a Logarithmic Total Variation (LTV) model-based method, which is particularly suited for separating "large-scale" (like skin area) and "small-scale" (like eyes, mouth and nose) facial components.
(5) Method E is a method which combines the Ratio Image Generation process and the Anisotropic Smoothing process.
(6) Method F is a method which combines the Homomorphic Filtering process and the Anisotropic Smoothing process.
(7) Method G is a method that performs the image operation module 13 without using of any illumination compensation method.

It should be noted that the aforementioned Histogram equalization method, Retinex method, and Logarithmic Total Variation (LTV) model-based method are well-known in the prior arts; therefore, there is no need to recite them in detail anymore here.

The recognition rates G1 of each of samples in the Experiment Example 2 are evaluated via the same recognition procedure MP1 implemented in the same recognition module 16 as those recited in the Experiment Example 1. Likewise, the obtained image recognition rates G are outputted via the same outputting module 17 as that recited in the Experiment Example 1, in which the image recognition rates G1 are sequenced in order from high to low.

As shown in Table 2, the recognition rates G1 of each of samples in the Experiment Example 2 are evaluated via the recognition procedure MP1, including the CMSM method, the RAW method and the GDA method respectively, implemented in the recognition module 16.

The image recognition rates G1 evaluated by Method A obtained through the CMSM method, the RAW method and the GDA method are 95.1%, 92.6%, and 93.4%, respectively, which are all greater than 90%. When the recognition procedure MP1 is the CMSM method, the image recognition rates G1 is even as high as 95.1%.

However, when the image operation module 13 is implemented with other five different illumination compensation methods, the image recognition rates G1 evaluated by these five different illumination compensation methods, including Method B through Method F, obtained through CMSM method, the RAW method and the GDA method are all far more lower than The image recognition rates G1 of Method A. This shows that the Method A, which is the method for extracting an image texture signal 1000 provided by the present invention, outperforms the other methods.

TABLE 2

|  | illumination compensation method | recognition procedure MP1 | | |
| --- | --- | --- | --- | --- |
|  |  | CMSM | RAW | GDA |
| image recognition rates G1 | Method A | 95.1% | 92.6% | 93.4% |
|  | Method B | 88.5% | 60.1% | 64.3% |
|  | Method C | 81.5% | 65.0% | 75.4% |
|  | Method D | 92.3% | 90.0% | 90.6% |
|  | Method E | 89.1% | 88.3% | 84.1% |
|  | Method F | 91.8% | 85.0% | 81.7% |
|  | Method G | 88.2% | 57.6% | 60.3% |

Experimental Example 3

Please refer to FIG. 4, FIG. 6 and Table 3. The Experimental Example 3 of the present invention adopts the face images of 40 persons to evaluate the recognition rate of the system for identifying an image 10. The face images are retrieved from the Yale database B, which is another famous face images databases. Specifically, the Yale database B contains 5760 single light source images of 10 subjects each was taken pictures under 576 viewing conditions (9 poses×64 illumination conditions). For every subject in a particular pose, an image with ambient (background) illumination was also captured. Hence, the total number of images is in fact 5760+90=5850. However, the Experimental Example 3 only test 1 pose (pose 0) of them; it means the Experimental Example 3 only use 640 images to evaluate the recognition rate G1. There are 64 images for each person, and in total there are 10 persons, therefore it consists of 640 images in total. By randomly separating the 10 persons, 5 of them are selected for enrollment, and the other 5 are for unenrollment. Then these 64 images are further separated into 6 sections (about 10 images per section), and only the first section is used for serving the training purpose, and the other five sections are for testing. Accordingly, 100 images of one of the four sections are regarded as the reference images R1. These 100 reference images R1 are then transformed to the 100 reference texture images R2 via the image operation module 13 implemented with the method for extracting an image texture signal 1000. The obtained 100 reference texture images R2 are then stored in the reference texture image database 14. The rest of 540 images of the other three of the four sections are regarded as the identification images M1. These 540 identification images M1 are then transformed to the 540 identification texture images M2 via the image operation module 13 implemented with the method for extracting an image texture signal 1000. The obtained 1200 identification texture images M2 are then stored in the identification texture image database 15.

To further evaluates the recognition rates G1 of the method for extracting an image texture signal 1000, the Experimental Example 3 adopts the recognition module 16, which is used for providing a recognition procedure MP1, to compare the identification texture image M2 with each of the reference texture images R2, thereby obtaining an image recognition rate G1 of the identification texture image M2 and each of the reference texture images R2. Specifically, the aforementioned recognition procedure MP1 can be the CMSM method, the RAW method, or the GDA method, as those recited in the second and the third preferred embodiment of the present invention.

The parameters used by the Experimental Example 3 are concretely set as the following:

The parameters of the sixth function, $H(u, v) = (r_H - r_L)[1 - e^{-c[D^2(u,v)/D_0^2]}] + r_L$, in the Homomorphic Filtering process of the first operation procedure are $r_H = 1.6$, $r_L = 0.5$, and $D_0 = 0.5$. When the recognition procedure MP1 is the CMSM method, the base number is set as 1296; when the recognition procedure MP1 is the GDA method, then the kernel sigma is 6000 and the feature dimension is 50. Accordingly, the obtained image recognition rates G are outputted via the outputting module 17, in which the image recognition rates G1 are sequenced in order from high to low.

Please refer to FIG. 6, which shows the three samples, including sample F, sample G, and sample H, randomly drawn from the 540 identification images M1 and the 540 identification texture images M2. Specifically, the identification images M1 of sample F are central-light source images; the identification images M1 of sample G are left-light source images; the identification images M1 of sample H are right-light source images. Each identification image M1 is retrieved from the Yale database B. Through the image data inputting module 12, each identification image M1 is extracted and obtained as the first image signal A1 of each sample. After the first image signal A1 of each sample is processed with the method for extracting an image texture signal 1000 implemented in the image operation module 13, the second image signal B1, the third image signal C1 and the fourth image signal D1 are obtained as shown in FIG. 6.

Specifically, in step S105 of the first preferred embodiment, the fourth image signal D1 is defined as the extracted texture signal E1. In addition, based on the third preferred embodiment, image operation module 13 is implemented with the method for extracting an image texture signal 1000, wherein the characteristics and the features of the method for extracting an image texture signal 1000 are substantially the same as those recited in the first preferred embodiment. Accordingly, the identification image M1 is transformed to the identification texture image M2 via the image operation module 13 implemented with the method for extracting an image texture signal 1000 in the third preferred embodiment. Therefore, the fourth image signal D1 of each said sample of this Experimental Example 3 is not only regarded as the identification texture image M2 as defined in the third preferred embodiment, but also regarded as the extracted texture signal E1 as defined in the first preferred embodiment.

As shown in Table 3, the recognition rates G1 of each of samples in the Experiment Example 3 are evaluated via the recognition procedure MP1, including the CMSM method, the RAW method and the GDA method respectively, implemented in the recognition module 16. The image recognition rates G1 obtained through the CMSM method, the RAW method and the GDA method are 97.8%, 95.6%, and 100.0%, respectively, which are all greater than 95%. When the recognition procedure MP1 is the GDA method, the image recognition rates G1 is even as high as 100.0%, thus demonstrating that the present invention can obtain image recognition rates G1 with high accuracy through the combination of the method for extracting an image texture signal 1000, the method for identifying image 2000, and the system for identifying an image 10.

TABLE 3

| recognition procedure MP1 | CMSM | RAW | GDA |
| --- | --- | --- | --- |
| image recognition rates G1 | 97.8% | 95.6% | 100.0% |

Experimental Example 4

Please refer to FIG. 4 and Table 4. The characteristics and the features of the system for identifying an image 10 adopted in the Experimental Example 4 are substantially the same as those recited in the Experimental Example 3. The Experimental Example 4, compared with the Experimental Example 3, the image operation module 13 is not only implemented with the method for extracting an image texture signal 1000, but also implemented with other five different illumination compensation methods. Accordingly, the illumination compensation methods adopted in the Experimental Example 4 are recited as follow (1) Method A is the method for extracting an image texture signal 1000 which is as the same as that recited in the Experimental Example 3.

(2) Method B is a Histogram equalization method.

(3) Method C is a Retinex method, which is an algorithm to simulate human vision which main concept is the perception of the human eye will be affected by the object reflectance spectra and the surrounding lighting source.

(4) Method D is a Logarithmic Total Variation (LTV) model-based method, which is particularly suited for separating "large-scale" (like skin area) and "small-scale" (like eyes, mouth and nose) facial components.

(5) Method E is a method which combines the Ratio Image Generation process and the Anisotropic Smoothing process.

(6) Method F is a method which combines the Homomorphic Filtering process and the Anisotropic Smoothing process.

(7) Method G is a method that performs the image operation module 13 without using of any illumination compensation method.

It should be noted that the aforementioned Histogram equalization method, Retinex method, and Logarithmic Total Variation (LTV) model-based method are well-known in the prior arts; therefore, there is no need to recite them in detail anymore here.

The recognition rates G1 of each of samples in the Experiment Example 4 are evaluated via the same recognition procedure MP1 implemented in the same recognition module 16 as those recited in the Experiment Example 3. Likewise, the obtained image recognition rates G are outputted via the same outputting module 17 as that recited in the Experiment Example 4, in which the image recognition rates G1 are sequenced in order from high to low.

As shown in Table 4, the recognition rates G1 of each of samples in the Experiment Example 4 are evaluated via the recognition procedure MP1, including the CMSM method, the RAW method and the GDA method respectively, implemented in the recognition module 16.

The image recognition rates G1 evaluated by Method A obtained through the CMSM method, the RAW method and the GDA method are 97.8%, 95.6%, and 100.0%, respectively, which are all greater than 95%. When the recognition procedure MP1 is the GDA method, the image recognition rates G1 is even as high as 100.0%.

However, when the image operation module 13 is implemented with other five different illumination compensation methods, the image recognition rates G1 evaluated by these five different illumination compensation methods, including Method B through Method F, obtained through CMSM method, the RAW method and the GDA method are all far more lower than The image recognition rates G1 of Method A. This shows that the Method A, which is the method for extracting an image texture signal 1000 provided by the present invention, outperforms the other methods.

TABLE 4

| | illumination compensation method | recognition procedure MP1 | | |
| --- | --- | --- | --- | --- |
| | | | CMSM | RAW | GDA |
| image recognition rates G1 | Method A | 97.8% | 95.6% | 100.0% |
| | Method B | 96.1% | 91.6% | 97.9% |
| | Method C | 95.8% | 87.8% | 97.8% |
| | Method D | 86.2% | 93.0% | 98.2% |
| | Method E | 93.9% | 83.7% | 95.9% |
| | Method F | 92.1% | 87.6% | 97.8% |
| | Method G | 90.0% | 82.6% | 92.2% |

Although some particular embodiments of the invention have been described in detail for purposes of illustration, it will be understood by one of ordinary skill in the art that numerous variations will be possible to the disclosed embodiments without going outside the scope of the invention as disclosed in the claims.

What is claimed is:

1. A method for extracting an image texture signal, comprising the steps of:
   (a) extracting a first image signal, the first image signal is formed by the multiplication product of a first low-frequency illuminance signal and a first high-frequency texture signal;
   (b) obtaining a second image signal by applying a first operation procedure to the first image signal, the second image signal comprising a second low-frequency illuminance signal and a second high-frequency texture signal, wherein the intensity of the second low-frequency illuminance signal is lower than the intensity of the first low-frequency illuminance signal and the intensity of the second high-frequency texture signal is not lower than the intensity of the first high-frequency texture signal;
   (c) obtaining a third image signal by applying a second operation procedure to the second image signal, the third image signal having a third high-frequency texture signal, wherein the intensity of the third high-frequency texture signal is not lower than the intensity of the second high-frequency texture signal, the third high-frequency texture signal further comprising a first noise signal;
   (d) obtaining a fourth image signal by applying a third operation procedure to the third image signal, the fourth image signal having a fourth texture signal, the fourth texture signal further comprising a second noise signal, wherein the intensity of the second noise signal of the fourth texture signal is lower than the intensity of the first noise signal of the third high-frequency texture signal; and
   (e) outputting the fourth image signal, whereby the first image signal is transformed through the method for extracting the image texture signal to become an extracted texture signal, wherein the fourth image signal is thereby defined as the extracted texture signal.

2. The method for extracting an image texture signal according to claim 1,
   wherein:
   the first operation procedure is a Homomorphic Filtering process;
   the second operation procedure is a Ratio Image Generation process; and
   the third operation procedure is an Anisotropic Smoothing process.

3. The method for extracting an image texture signal according to claim 1, wherein the first image signal is defined as a first function, the first low-frequency illuminance signal being defined as a second function, the first high-frequency texture signal being defined as a third function, wherein step (b) further comprises the steps of:
   (b1) adopting a logarithmic operation to the first function to obtain a fourth function;
   (b2) adopting a Fourier Transform operation to the fourth function to obtain a fifth function;
   (b3) providing a sixth function, wherein the sixth function is a low-frequency filtering function;
   (b4) multiplying the sixth function and the fifth function to obtain a seventh function;
   (b5) adopting an inverse Fourier Transform operation to the seventh function to obtain an eighth function; and
   (b6) adopting an exponential operation to the eighth function to obtain a ninth function, wherein the ninth function is thereby defined as the second image signal.

4. The method for extracting an image texture signal according to claim 1, wherein step (c) further comprises the steps of:
   (c1) defining a tenth function, wherein the tenth function is defined as a plurality of light-related factors that influence the second image signal;
   (c2) defining an eleventh function, wherein the eleventh function is obtained by convoluting a twelfth function with a Gaussian function;
   (c3) defining a relationship between the tenth function and the eleventh function, wherein the tenth function and the eleventh function are defined as light-related low-frequency image factors that influence the second image signal; and
   (c4) defining a thirteenth function, wherein the thirteenth function is defined as a ratio of the twelfth function and the eleventh function, the thirteenth function is thereby defined as the third image signal.

5. The method for extracting an image texture signal according to claim 1, wherein step (d) further comprises the steps of:
   (d1) defining $N(x,y)$ as a single-channel image value of an image pixel of the coordinates $(x, y)$ in the third image signal;
   (d2) defining $\Delta_E$ as a difference in single-channel image values between the image pixel of the coordinates $(x, y)$ and an image pixel of the coordinates $(x+1, y)$ in the third image signal;
   (d3) defining $\Delta_W$ as a difference in single-channel image values between the image pixel of the coordinates $(x, y)$ and an image pixel of the coordinates $(x-1, y)$ in the third image signal;
   (d4) defining $\Delta_S$ as a difference in single-channel image values between the image pixel of the coordinates $(x, y)$ and an image pixel of the coordinates $(x, y+1)$ in the third image signal;
   (d5) defining $\Delta_N$ as a difference in single-channel image values between the image pixel of the coordinates $(x, y)$ and an image pixel of the coordinates $(x, y-1)$ in the third image signal;
   (d6) defining a fourteenth function; and
   (d7) applying a smoothing operation to the fourteenth function for t times to obtain the fourth image signal, wherein t is an integral value which is not lower than 1.

6. The method for extracting an image texture signal according to claim 5, wherein the single-channel image value is selected from the group consisting of gray scale value, monochrome value and illuminance value.

7. A method for identifying image, comprising the steps of:
   (i) providing at least one reference image;
   (ii) obtaining a reference texture image by applying a method for extracting an image texture signal to the reference image;
   (iii) providing an identification image;
   (iv) obtaining an identification texture image by applying the method for extracting an image texture signal to the identification image; and
   (v) comparing the identification texture image with the reference texture image and then applying a recognition procedure to the identification texture image and the reference texture image to obtain an image recognition rate;
   wherein the method for extracting an image texture signal comprises
   the steps of:

(a) extracting a first image signal, the first image signal is formed by the multiplication product of a first low-frequency illuminance signal and a first high-frequency texture signal;

(b) obtaining a second image signal by applying a first operation procedure to the first image signal, the second image signal comprising a second low-frequency illuminance signal and a second high-frequency texture signal, wherein the intensity of the second low-frequency illuminance signal is lower than the intensity of the first low-frequency illuminance signal and the intensity of the second high-frequency texture signal is not lower than the intensity of the first high-frequency texture signal;

(c) obtaining a third image signal by applying a second operation procedure to the second image signal, the third image signal having a third high-frequency texture signal, wherein the intensity of the third high-frequency texture signal is not lower than the intensity of the second high-frequency texture signal, the third high-frequency texture signal further comprising a first noise signal;

(d) obtaining a fourth image signal by applying a third operation procedure to the third image signal, the fourth image signal having a fourth texture signal, the fourth texture signal further comprising a second noise signal, wherein the intensity of the second noise signal of the fourth texture signal is lower than the intensity of the first noise signal of the third high-frequency texture signal; and (e) outputting the fourth image signal, whereby the first image signal is transformed through the method for extracting the image texture signal to become an extracted texture signal, wherein the fourth image signal is thereby defined as the extracted texture signal.

8. The method for identifying image according to claim 7, wherein:
the first operation procedure is a Homomorphic Filtering process;
the second operation procedure is a Ratio Image Generation process; and
the third operation procedure is an Anisotropic Smoothing process.

9. The method for identifying image according to claim 7, wherein the first image signal is defined as a first function, the first low-frequency illuminance signal being defined as a second function, the first high-frequency texture signal being defined as a third function, wherein step (b) further comprises the steps of:

(b1) adopting a logarithmic operation to the first function to obtain a fourth function;

(b2) adopting a Fourier Transform operation to the fourth function to obtain a fifth function;

(b3) providing a sixth function, wherein the sixth function is a low-frequency filtering function;

(b4) multiplying the sixth function and the fifth function to obtain a seventh function;

(b5) adopting an inverse Fourier Transform operation to the seventh function to obtain an eighth function; and (b6) adopting an exponential operation to the eighth function to obtain a ninth function, wherein the ninth function is thereby defined as the second image signal.

10. The method for identifying image according to claim 7, wherein step (c) further comprises the steps of:

(c1) defining a tenth function, wherein the tenth function is defined as a plurality of light-related factors that influence the second image signal;

(c2) defining an eleventh function, wherein the eleventh function is obtained by convoluting a twelfth function with a Gaussian function;

(c3) defining a relationship between the tenth function and the eleventh function, wherein the tenth function and the eleventh function are defined as light-related low-frequency image factors that influence the second image signal; and (c4) defining a thirteenth function, wherein the thirteenth function is defined as a ratio of the twelfth function and the eleventh function, the thirteenth function is thereby defined as the third image signal.

11. The method for identifying image according to claim 7, wherein step (d) further comprises the steps of:

(d1) defining $N(x,y)$ as a single-channel image value of an image pixel of the coordinates (x, y) in the third image signal;

(d2) defining $\Delta_E$ as a difference in single-channel image values between the image pixel of the coordinates (x, y) and an image pixel of the coordinates (x+1, y) in the third image signal;

(d3) defining $\Delta_W$ as a difference in single-channel image values between the image pixel of the coordinates (x, y) and an image pixel of the coordinates (x−1, y) in the third image signal;

(d4) defining $\Delta_S$ as a difference in single-channel image values between the image pixel of the coordinates (x, y) and an image pixel of the coordinates (x, y+1) in the third image signal;

(d5) defining $\Delta_N$ as a difference in single-channel image values between the image pixel of the coordinates (x, y) and an image pixel of the coordinates (x, y−1) in the third image signal;

(d6) defining a fourteenth function; and (d7) applying a smoothing operation to the fourteenth function for t times to obtain the fourth image signal, wherein t is an integral value which is not lower than 1.

12. The method for identifying image according to claim 11, wherein the single-channel image value is selected from the group consisting of gray scale value, monochrome value and illuminance value.

13. A system for identifying an image, comprising:
a reference image database for storing a plurality of reference images;
an image data inputting module for receiving at least one identification image;
an image operation module for providing a method for extracting an image texture signal, the image operation module transforming the plurality of reference images stored in the reference image database to a plurality of reference texture images and transforming the identification image to an identification texture image;
a reference texture image database for storing the plurality of reference texture images;
an identification texture image database for storing the identification texture image;
a recognition module for providing a recognition procedure to compare the identification texture image with each of the reference texture images, thereby obtaining a plurality of image recognition rates, wherein each of the image recognition rate is of the identification texture image and each of the reference texture images; and an outputting module for outputting the recognition rates, in which the recognition rates are sequenced in order from high to low;
wherein the method for extracting an image texture signal comprises the steps of:
(a) extracting a first image signal, the first image signal is formed by the multiplication product of a first low-frequency illuminance signal and a first high-frequency texture signal;
(b) obtaining a second image signal by applying a first operation procedure to the first image signal, the second image signal comprising a second low-frequency illuminance signal and a second high-frequency texture signal, wherein the intensity of the second low-frequency illuminance signal is lower than the intensity of the first low-frequency illuminance signal and the intensity of the second high-frequency texture signal is not lower than the intensity of the first high-frequency texture signal;
(c) obtaining a third image signal by applying a second operation procedure to the second image signal, the third image signal having a third high-frequency texture signal, wherein the intensity of the third high-frequency texture signal is not lower than the intensity of the second high-frequency texture signal, the third high-frequency texture signal further comprising a first noise signal;
(d) obtaining a fourth image signal by applying a third operation procedure to the third image signal, the fourth image signal having a fourth texture signal, the fourth texture signal further comprising a second noise signal, wherein the intensity of the second noise signal of the fourth texture signal is lower than the intensity of the first noise signal of the third high-frequency texture signal; and
(e) outputting the fourth image signal, whereby the first image signal is transformed through the method for extracting the image texture signal to become an extracted texture signal, wherein the fourth image signal is thereby defined as the extracted texture signal.

14. The system for identifying an image according to claim 13, wherein:
the first operation procedure is a Homomorphic Filtering process;
the second operation procedure is a Ratio Image Generation process; and
the third operation procedure is an Anisotropic Smoothing process.

15. The system for identifying an image according to claim 13, wherein the first image signal is defined as a first function, the first low-frequency illuminance signal being defined as a second function, the first high-frequency texture signal being defined as a third function, wherein step (b) further comprises the steps of:
(b1) adopting a logarithmic operation to the first function to obtain a fourth function;
(b2) adopting a Fourier Transform operation to the fourth function to obtain a fifth function;
(b3) providing a sixth function, wherein the sixth function is a low-frequency filtering function;
(b4) multiplying the sixth function and the fifth function to obtain a seventh function;
(b5) adopting an inverse Fourier Transform operation to the seventh function to obtain an eighth function; and
(b6) adopting an exponential operation to the eighth function to obtain a ninth function, wherein the ninth function is thereby defined as the second image signal.

16. The system for identifying an image according to claim 13, wherein step (c) further comprises the steps of:
(c1) defining a tenth function, wherein the tenth function is defined as a plurality of light-related factors that influence the second image signal;
(c2) defining an eleventh function, wherein the eleventh function is obtained by convoluting a twelfth function with a Gaussian function;
(c3) defining a relationship between the tenth function and the eleventh function, wherein the tenth function and the eleventh function are defined as light-related low-frequency image factors that influence the second image signal; and
(c4) defining a thirteenth function, wherein the thirteenth function is defined as a ratio of the twelfth function and the eleventh function, the thirteenth function is thereby defined as the third image signal.

17. The system for identifying an image according to claim 13, wherein step (d) further comprises the steps of:
(d1) defining $N(x,y)$ as a single-channel image value of an image pixel of the coordinates $(x, y)$ in the third image signal;
(d2) defining $\Delta_E$ as a difference in single-channel image values between the image pixel of the coordinates $(x, y)$ and an image pixel of the coordinates $(x+1, y)$ in the third image signal;
(d3) defining $\Delta_W$ as a difference in single-channel image values between the image pixel of the coordinates $(x, y)$ and an image pixel of the coordinates $(x-1, y)$ in the third image signal;
(d4) defining $\Delta_S$ as a difference in single-channel image values between the image pixel of the coordinates $(x, y)$ and an image pixel of the coordinates $(x, y+1)$ in the third image signal;
(d5) defining $\Delta_N$ as a difference in single-channel image values between the image pixel of the coordinates $(x, y)$ and an image pixel of the coordinates $(x, y-1)$ in the third image signal;
(d6) defining a fourteenth function; and
(d7) applying a smoothing operation to the fourteenth function for t times to obtain the fourth image signal, wherein t is an integral value which is not lower than 1.

18. The system for identifying an image according to claim 17, wherein the single-channel image value is selected from the group consisting of gray scale value, monochrome value and illuminance value.

* * * * *